US010981843B2

(12) United States Patent
Reid et al.

(10) Patent No.: US 10,981,843 B2
(45) Date of Patent: Apr. 20, 2021

(54) POLYMER COMPOSITE HAVING DISPERSED TRANSITION METAL OXIDE PARTICLES

(71) Applicants: University of Central Florida Research Foundation, Inc., Orlando, FL (US); The Texas A&M University System, College Station, TX (US)

(72) Inventors: David L. Reid, Orlando, FL (US); Sudipta Seal, Orlando, FL (US); Eric Petersen, College Station, TX (US); Robert Draper, Orlando, FL (US)

(73) Assignees: University of Central Florida Research Foundation, Inc., Orlando, FL (US); The Texas A&M University System, College Station, TX (US)

(*) Notice: Subject to any disclaimer, the term of this patent is extended or adjusted under 35 U.S.C. 154(b) by 22 days.

(21) Appl. No.: 16/409,345

(22) Filed: May 10, 2019

(65) Prior Publication Data
US 2019/0270684 A1 Sep. 5, 2019

Related U.S. Application Data

(62) Division of application No. 13/797,448, filed on Mar. 12, 2013, now Pat. No. 10,370,306.
(Continued)

(51) Int. Cl.
C06B 45/10 (2006.01)
C06B 23/00 (2006.01)
(Continued)

(52) U.S. Cl.
CPC .......... C06B 45/105 (2013.01); C06B 23/007 (2013.01); C06B 45/10 (2013.01); C08F 136/06 (2013.01); C08J 3/205 (2013.01)

(58) Field of Classification Search
CPC ..... C06B 45/105; C06B 23/007; C06B 45/10; C08F 136/06; C08J 3/205
(Continued)

(56) References Cited

U.S. PATENT DOCUMENTS 5,753,853 A * 5/1998 Monte ...................... C06B 45/10
149/19.2
6,197,135 B1 * 3/2001 Monte ................ C06B 21/0025
149/19.1
(Continued)

FOREIGN PATENT DOCUMENTS

JP 2004277512 A * 10/2004
JP 2012036306 A * 2/2012

OTHER PUBLICATIONS

Lantelme et al., "In situ polymerization of titanium alkoxides in polyvinyl acetate," J. Non-Crystalline Solids, vol. 194, 63-71. (Year: 1996).*
(Continued)

Primary Examiner — Josephine L Chang
(74) Attorney, Agent, or Firm — Timothy H. Van Dyke; Wolter Van Dyke Davis, PLLC

(57) ABSTRACT

A method of forming polymer composites includes mixing a transition metal oxide precursor including at least one transition metal, a polymer as a binder, a solvent for the polymer, and water to form a first solution including polymer-transition metal complexes. The polymer-transition metal complexes are hydrolyzed to produce a plurality of transition metal oxide nanoparticles, wherein water is added in the mixing in a stoichiometric excess for the hydrolyzing. The solvent and residual of the water remaining after the hydrolyzing are removed. A polymer composite including the transition metal oxide nanoparticles dispersed in the polymer results after the removing, where some of the
(Continued)

polymer is chemically conjugated to a surface of the transition metal oxide nanoparticles.

10 Claims, 1 Drawing Sheet

Related U.S. Application Data

(60) Provisional application No. 61/609,461, filed on Mar. 12, 2012.

(51) Int. Cl.
   *C08J 3/205* (2006.01)
   *C08F 136/06* (2006.01)
(58) Field of Classification Search
   USPC .................................................. 149/19.2
   See application file for complete search history.

(56) References Cited

U.S. PATENT DOCUMENTS 8,066,834 B1 * 11/2011 Petersen .............. C01G 23/053
                                                                149/76
10,370,306 B2 * 8/2019 Reid ..................... C06B 23/007

OTHER PUBLICATIONS

JP 2004-277512 A, machine translation, IP.com. (Year: 2004).*
JP 2012-036306 A, machine translation, EPO espacenet. (Year: 2012).*

* cited by examiner

POLYMER COMPOSITE HAVING DISPERSED TRANSITION METAL OXIDE PARTICLES

CROSS REFERENCE TO RELATED APPLICATIONS

This application claims the benefit of Non-Provisional patent application Ser. No. 13/797,448, entitled "POLYMER COMPOSITE HAVING DISPERSED TRANSITION METAL OXIDE PARTICLES" filed Mar. 12, 2013, which claims priority to Provisional Application Ser. No. 61/609,463 entitled "POLYMER COMPOSITE HAVING DISPERSED TRANSITION METAL OXIDE PARTICLES", filed Mar. 12, 2012, which are both herein incorporated by reference in their entireties.

FIELD

Disclosed embodiments relate to methods for forming polymer composites having dispersed transition metal oxide particles.

BACKGROUND

Additives comprising fractions of a percent to several percent of solid propellant mixtures have been considered through the years and are commonly employed in many rocket propellant and explosive compositions. Various additives include burn-rate modifiers (e.g., ferric oxide, metal oxides, and organometallics), curing agents, and plasticizers. In certain cases, additions of small (e.g., <5% by weight) amounts of powdered material to the propellant mixture have been shown to increase or otherwise favorably modify the burn rate. Nanoparticle additives may have an even further influence on the burn rate because of their high surface-to-volume ratios.

One known solution-phase synthesis of titania nanoparticles is the sol-gel method, in which an organometallic titanium precursor such as a titanium tetraalkoxide is reacted with water to form a suspension of titania nanoparticles, which is then dried to form a powder. Such titania powders produced by this method act as catalysts to increase the burning rate of composite solid propellants. In the current state of the art, the titania nanoparticles are incorporated into the composite propellant by mechanically mixing the powder with a polymer binder, such as hydroxyl-terminated polybutadiene (HTPB).

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments are based on the recognition that the above-described conventional sol-gel method or other powder-based methods of polymer composite manufacture for propellant compositions causes the titania (or other transition metal oxide) nanoparticles to tend to agglomerate, rather than dispersing uniformly in the polymer propellant binder, particularly for highly viscous propellant binders. Nanoparticle agglomeration can significantly reduce the catalytic efficacy of the titania or other transition metal oxide nanoparticles. Handling nanoparticulate powders also poses a worker health and safety problem, due to dust issues. Although disclosed embodiments are generally described for titania ($TiO_2$) nanoparticles, disclosed methods can be used to form various transition metal oxide particles other than Ti-based, including Fe, Zr, Al, V, In, and Cr, or mixed oxide particles containing two or more transition metals.

Disclosed embodiments include in-situ synthesis methods of dispersing transition metal oxide nanoparticles inside a polymer binder that solves the known problem of transition metal oxide nanoparticle agglomeration, such as the aggregation of titania nanoparticles in the propellant binder of solid propellant mixtures. By disclosed embodiments starting with a polymer-transition metal complex, where the polymer includes functionality for bonding (e.g., OH or COOH functionality), the polymer remains chemically conjugated to the surface of the resulting metal oxide nanoparticles, which prevents nanoparticle agglomeration even with a high (e.g., up to 5 wt. %) metal oxide nanoparticle concentration. Disclosed methods also reduce handling and improve the safety compared to known powder-based preparation methods.

By preventing aggregation of the transition metal oxide nanoparticles, disclosed methods achieve a more uniform dispersion of the transition metal oxide in the polymer, where the transition metal oxide nanoparticles generally consist at least primarily of single particles. As a result, in the case of transition metal oxide (e.g. titania) nanoparticles in polymer binders for propellant or explosive compositions, the effectiveness of the transition metal oxide as catalysts for propellant or explosive performance is significantly increased.

DETAILED DESCRIPTION

Figure 1A:
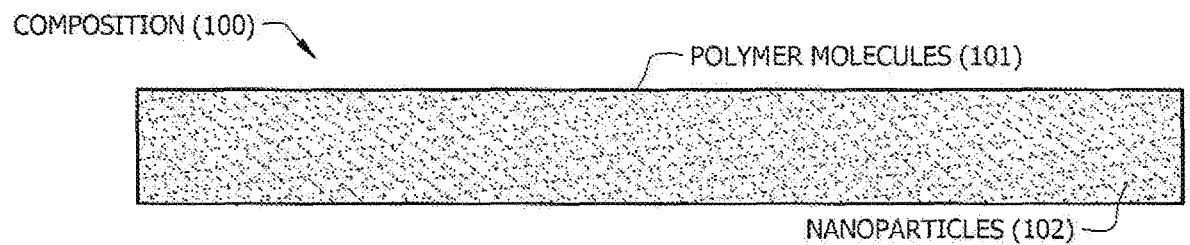
FIG. 1A is a depiction of an example composition of matter comprising a polymer providing a continuous phase, and a plurality of transition metal oxide nanoparticles dispersed in the polymer, wherein some of the polymer molecules are chemically conjugated to a surface of transition metal oxide nanoparticles.

Disclosed embodiments in this Disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

Disclosed embodiments include methods of forming polymer composites having transition metal oxide nanoparticles dispersed therein. Two example methods of in-situ transition metal oxide synthesis in polymer binders, such as in Hydroxyl Terminated Polybutadiene (HTPB), are described herein. Both methods form a polymer-transition metal complex while preventing the tendency of transition metal compounds to cross-link the polymer, followed by a hydrolysis of the transition metal complex at an optional elevated temperature (e.g., 80 to 95° C.) to produce nanocrystalline transition metal oxide nanoparticles. Lower hydrolysis temperatures produce increasingly amorphous transition metal oxide nanoparticles. For polymer binders having a relatively low molecular weight, such as hydroxyl-terminated polybutadiene (HTPB), resulting polymer composites are liquid phase.

Disclosed methods produce highly unagglomerated metal oxide nanoparticles with a maximum dispersion in the polymer. The metal oxide nanoparticles are generally at least primarily single particles. For relatively low molecular weight polymer binders such as HTPB, resulting polymer composites are liquid phase. When the nanoparticles comprise titania and the composition is a propellant composition, such propellant compositions have been verified to exhibit similar performance (e.g., burn rate) to current state of the art propellant compositions containing titania nanoparticles, fuel and oxidizer, but in one test performed were found to use approximately only 1/10th the mass loading of titania, which evidences the highly dispersed nature of the titania nanoparticles in the polymer composite for disclosed composites.

A transition metal oxide precursor is mixed with a polymer binder, a solvent for the polymer binder, and water to form a first solution including polymer-transition metal complexes. In the case the transition metal is titanium and the transition metal oxide is titania, the titanium precursor can generally be any titanium alkoxide, with or without an additional chelating agent such as acetate or acetylacetone, or can comprise titanium tetrachloride.

One example polymer binder is HTPB, a common solid propellant binder. However, disclosed embodiments can use a variety of other polymer binders provided the binder provides OH functionality which is typical of known polymer binders for explosive compositions, such as HTPB and polybutadiene acrylonitrile (PBAN). Disclosed methods will also generally work with polymer binders having COOH (carboxylic acid) functionality. Example polymer binders with OH or COOH functionality include, but are not limited to, HTPB and PBAN (both disclosed above), polybutadiene acrylic acid (PBAA), carboxyl terminated polybutadiene (CTPB), polyglycidyl nitrate (PGN), glycidyl azide prepolymer (GAP), poly(3,3-bis(azidomethyl) Oxetane) Poly (BAMO), poly (3-azidomethyl 3-methyl oxetane) Poly (AMMO), and poly (3-nitratomethyl methyl oxetane) poly (NIMMO).

The polymer-transition metal complexes is hydrolyzed to produce a plurality of transition metal oxide nanoparticles, wherein water is added in the mixing in a stoichiometric excess for the hydrolyzing. The hydrolyzing is performed at a temperature below 100° C. There is generally no lower temperature limit, except to prevent freezing of the solution. As noted above, higher temperatures will produce particles with a greater degree of crystallinity, while lower temperatures will favor amorphous transition metal oxide nanoparticles. The solvent and residual water remaining after hydrolyzing are then removed, such as by distillation or evaporation, with a polymer solution including a plurality of transition metal oxide nanoparticles dispersed therein resulting after the removing, that may be a liquid solution or solid solution depending on whether the polymer binder is a liquid or solid at room temperature after the solvent is removed (e.g. evaporated).

Before the above-described mixing, the transition metal precursor can be combined with a chelating agent, such as acetylacetone (ACAC), and the mixing can comprise adding the transition metal precursor combined with the chelating agent to a solution of polymer binder, solvent and water to form the first solution.

In a first method embodiment, which is a surfactant-free method, the solvent comprises a non-polar solvent (e.g., heptane), and the method further comprises adding a hydroxide (OH) comprising material, such as an alcohol (e.g., ethanol or isopropanol) or a carboxylic acid (e.g., acetic acid) to the first solution, wherein the removing step includes removal of the hydroxide comprising material. As used herein and known in the art, a non-polar solvent is a solvent that does not have a permanent electric dipole moment. Higher volatility hydroxide comprising materials ease subsequent removal. The hydroxide comprising material is added in sufficient quantities to prevent crosslinking of the polymer binder (e.g., HTPB) via bridging transition metal (e.g. Ti) cations. The stoichiometric excess of water added has some limited solubility in the polymer binder-solvent-alcohol system, and slowly hydrolyzes the HTPB-transition metal complex.

The limited diffusion of the transition metal (e.g., Ti) due to the large molecular weight and steric hindrance from the polymer-transition metal complex limits the transition metal oxide particle growth, generally resulting in very small transition metal oxide nanoparticles. The transition metal oxide nanoparticles typically have an average diameter of about 1 nm to 30 nm, such as an average diameter of 10 nm to 30 nm. Once the reaction is complete, the solvent, hydroxide comprising material (e.g., alcohol), and residual water is removed, such as by distillation or evaporation. The result is a polymer containing an ultrafine dispersion of transition metal oxide nanoparticles having polymer molecules bound to the surface of the nanoparticles, which when the nanoparticles comprise titania may be used following known procedures to produce a composite solid propellant, such as by adding fuel particles and an optional oxidizer, and also optionally adding a surfactant.

In a second method embodiment, the method further comprises adding a surfactant to the first solution, wherein before mixing the transition metal oxide precursor is combined with a chelating agent, such as acetylacetonate (ACAC). In this embodiment the first solution after mixing can provide a single phase inverse microemulsion. The surfactant concentration generally ranges from 0.1% to 10 wt. % in solution, and 0.1 to 10 wt. % of the final composite. The surfactant can generally comprise a cationic, anionic, non-ionic or amphoteric/zwitterionic surfactant.

The microemulsion further helps protect the polymer from crosslinking, provides better protection against nanoparticle agglomeration, and serves as microreactors to control the nanoparticle size and morphology. Alcohol can optionally be eliminated from this procedure (and that of the surfactant-free first method described above) if the transition metal precursor is first combined with a chelating agent, such as ACAC.

To form the microemulsion, a polymer such as HTPB, a non-polar solvent (e.g. heptane), a surfactant, and water can be combined in a ratio with the water exceeding the stoichiometric amount, and the other components to form a single-phase inverse microemulsion. Separately, a transition metal (e.g., titanium) tetraisopropoxide and the chelating agent (e.g., ACAC) can be combined in a 1:2 molar ratio, and this solution is slowly added to the microemulsion. The solution can then be stirred at an optional elevated temperature (<100° C.) to allow the diffusion of transition metal compounds into the microemulsion water droplets, where hydrolysis, condensation, and crystalline particle growth take place. Once the reaction is complete, the excess solvent and water can be removed by distillation or evaporation. The result is a polymer composite solution containing a homogeneous dispersion of crystalline unagglomerated transition metal oxide (e.g., titania) nanoparticles having polymer molecules chemically bound to the surface of the transition metal oxide nanoparticles.

FIG. 1A shows a depiction of an example composition of matter 100 comprising polymer molecules 101 providing a continuous phase, and a plurality of transition metal oxide nanoparticles 102 dispersed in the polymer. The continuous phase can be a liquid or a solid. Some of the polymer molecules 101 are chemically conjugated (chemically bound) to the outer surface of the single transition metal oxide nanoparticles 102, as shown in FIG. 1B.

Figure 1B:
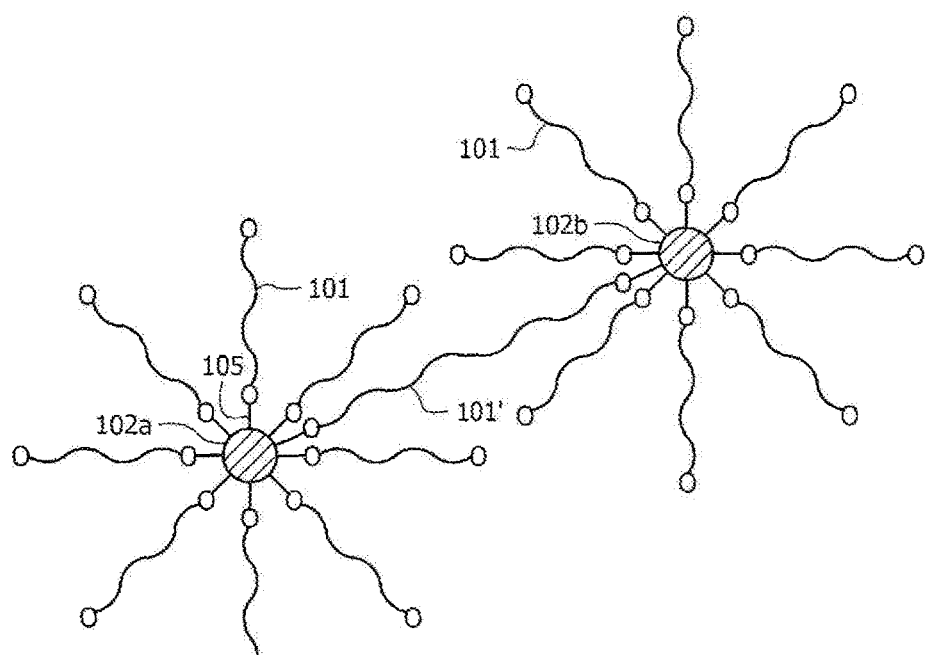
FIG. 1B depicts single transition metal oxide nanoparticles having a polymer chemically conjugated to their surface, with the polymer chemically bound to the surface of one nanoparticle also bonded to the surface of another nanoparticle.

FIG. 1B depicts single transition metal oxide nanoparticles 102a and 102b each having a plurality of polymer molecules 101 chemically conjugated to their outer surface, with one of the polymer molecules 101 shown as 101' being chemically bound to the surface of both metal oxide nanoparticle 102a and metal oxide nanoparticle 102b. Chemical bonds between the polymer molecules 101 and the metal oxide nanoparticles 102a and 102b are shown as 105. "O" in FIG. 1B represents oxygen supplied by the hydroxide group of the polymer molecules (e.g., where the polymer molecules 101 include functionality for bonding (e.g., OH or COOH functionality)). As described above, the polymer molecules 101 being chemically conjugated to the surface of the metal oxide nanoparticles 102a, 102b prevents nanoparticle agglomeration even with a high (e.g., up to 5 wt. %) metal oxide nanoparticle concentration.

Disclosed polymer composites having dispersed metal oxide particles therein can be used in a variety of applications, including for uses as catalysts for propellant and explosive compositions. For a typical propellant application, in the specific case the transition metal oxide nanoparticles comprise titania and the polymer binder is liquid phase at room temperature such as HTPB, the method can further comprise adding an optional oxidizer agent (e.g., ammonium perchlorate (AP) or ammonium nitrate (AN)) and fuel particles to a disclosed liquid polymer solution, and then curing the polymer (crosslinking) to form a composite solid propellant. Fuel particles and an optional oxidizer, and any other desired constituents of the propellant, can be added to a disclosed liquid polymer solution by physical mixing, either before, during, or after the evaporation/removal of the solvent.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

Thus, the breadth and scope of the subject matter provided in this Disclosure should not be limited by any of the above explicitly described embodiments. Rather, the scope of this Disclosure should be defined in accordance with the following claims and their equivalents.

The invention claimed is:

1. A method of forming polymer composites, comprising:
   (a) mixing a transition metal oxide precursor including at least one transition metal, a polymer as a binder, a solvent for said polymer, and water to form a first solution including polymer-transition metal complexes;
   (b) hydrolyzing said polymer-transition metal complexes to produce a plurality of transition metal oxide nanoparticles, wherein said water is added in said mixing in a stoichiometric excess for said hydrolyzing, and
   (c) removing said solvent and residual of said water remaining after said hydrolyzing,
   (i) wherein a polymer composite including said plurality of transition metal oxide nanoparticles dispersed in said polymer results after said removing, and
   (ii) wherein some of said polymer is chemically conjugated to a surface of said transition metal oxide nanoparticles; and one or more of the following:
   (iii) combining said transition metal oxide precursor with a chelating agent before said mixing, and wherein said mixing comprises adding said transition metal oxide precursor combined with said chelating agent to a solution of said polymer, said solvent, and said water to form said first solution;
   (iv) adding a surfactant to said first solution, wherein said first solution after said mixing provides a single phase inverse microemulsion; or
   (v) wherein when said polymer composite is in liquid phase at room temperature, adding an oxidizer and fuel particles to said polymer composite, and curing said polymer to form a composite solid propellant.

2. The method of claim 1, wherein said polymer provides OH functionality or COOH functionality.

3. The method of claim 1, wherein said transition metal comprises titanium.

4. The method of claim 1, wherein said transition metal oxide nanoparticles comprise single particles.

5. The method of claim 1, wherein said transition metal oxide nanoparticles have an average diameter of 1 nm to 30 nm.

6. The method of claim 5, wherein said transition metal oxide nanoparticles have an average diameter of 10 nm to 30 nm.

7. The method of claim 1, wherein said solvent comprises a non-polar solvent, further comprising adding a hydroxide comprising material to said first solution, and wherein said removing includes removal of said hydroxide comprising material.

8. The method of claim 1, wherein said hydrolyzing is performed at a temperature below 100° C.

9. A method of forming polymer composites, comprising:
   combining a transition metal oxide precursor with a chelating agent,
   mixing said transition metal oxide precursor and said chelating agent with at least one transition metal, a polymer as a binder, a solvent for said polymer, a surfactant, and water to form a first solution including polymer-transition metal complexes; wherein said first solution after said mixing provides a single phase inverse microemulsion;

hydrolyzing said polymer-transition metal complexes to produce a plurality of transition metal oxide nanoparticles, wherein said water is added in said mixing in a stoichiometric excess for said hydrolyzing, and removing said solvent and residual of said water remaining after said hydrolyzing, wherein a polymer composite including said transition metal oxide nanoparticles dispersed in said polymer results after said removing, and wherein some of said polymer is chemically conjugated to a surface of said transition metal oxide nanoparticles.

10. The method of claim 9, wherein said transition metal oxide nanoparticles comprise single particles.

* * * * *

UNITED STATES PATENT AND TRADEMARK OFFICE
CERTIFICATE OF CORRECTION

| | | |
|---|---|---|
| PATENT NO. | : 10,981,843 B2 | Page 1 of 1 |
| APPLICATION NO. | : 16/409345 | |
| DATED | : April 20, 2021 | |
| INVENTOR(S) | : David L. Reid et al. | |

It is certified that error appears in the above-identified patent and that said Letters Patent is hereby corrected as shown below:

In the Specification

Please add the following new paragraph at Column 1, Line 17:
-- STATEMENT REGARDING FEDERALLY SPONSORED RESEARCH
This invention was made with Government support under NSF-EEC-1004859 awarded by the National Science Foundation. The Government has certain rights in this invention. --

Signed and Sealed this
Tenth Day of August, 2021

Drew Hirshfeld
*Performing the Functions and Duties of the
Under Secretary of Commerce for Intellectual Property and
Director of the United States Patent and Trademark Office*